US008357752B2

(12) United States Patent
Pastrana et al.

(10) Patent No.: US 8,357,752 B2
(45) Date of Patent: Jan. 22, 2013

(54) TINTED SPRAY BUFF AND TIECOAT

(75) Inventors: Tony T. Pastrana, Millersville, PA (US); Keith T. Quisenberry, Thorndale, PA (US)

(73) Assignee: Armstrong World Industries, Inc., Lancaster, PA (US)

( * ) Notice: Subject to any disclaimer, the term of this patent is extended or adjusted under 35 U.S.C. 154(b) by 522 days.

(21) Appl. No.: 12/425,560

(22) Filed: Apr. 17, 2009

(65) Prior Publication Data

US 2009/0269500 A1 Oct. 29, 2009

Related U.S. Application Data

(60) Provisional application No. 61/125,176, filed on Apr. 23, 2008.

(51) Int. Cl.

| | |
|---|---|
| ***C08L 31/00*** | (2006.01) |
| ***C08L 67/00*** | (2006.01) |
| ***B05D 1/02*** | (2006.01) |
| ***B05D 3/12*** | (2006.01) |
| ***B05D 3/00*** | (2006.01) |

(52) U.S. Cl. ........ 524/556; 524/599; 427/325; 427/331; 427/369

(58) Field of Classification Search .................. 524/556, 524/599; 427/325, 331, 369
See application file for complete search history.

(56) References Cited

U.S. PATENT DOCUMENTS

| | | | | |
|---|---|---|---|---|
| 2004/0013796 | A1* | 1/2004 | Metzger | 427/140 |
| 2005/0136277 | A1* | 6/2005 | Daly et al. | 428/537.1 |
| 2006/0127569 | A1* | 6/2006 | Metzger | 427/140 |

* cited by examiner

*Primary Examiner* — Michael M Bernshteyn
(74) *Attorney, Agent, or Firm* — McNees Wallace & Nurick LLC

(57) ABSTRACT

A tinted coating for a hard-surfaced floor, such as a hardwood floor, includes a base component and at least one colorant. The base component comprises an acrylic polymer and water, and the colorant is selected from the group consisting of a tint, a dye, and a pigment. The tinted coating is either a tinted tiecoat or a tinted spray buff. The tinted coating is used to improve the appearance of the hard-surfaced floor.

10 Claims, 3 Drawing Sheets

TINTED SPRAY BUFF AND TIECOAT

CROSS-REFERENCE TO RELATED APPLICATIONS

This application claims priority from U.S. Patent Application Ser. No. 61/125,176, filed Apr. 23, 2008, which is hereby incorporated by reference in its entirety.

FIELD OF THE INVENTION

The present invention relates to a tinted coating for a hard-surfaced floor wherein the tinted coating is a tinted spray buff or a tinted tiecoat. The invention further relates to a method of improving the appearance of a hard-surfaced floor by applying a tinted coating, such as a tinted spray buff or tinted tiecoat, to the hard-surfaced floor.

BACKGROUND OF THE INVENTION

Over time, commercial and residential hard-surfaced floors, such as hardwood floors, can begin to exhibit wear. For example, in high traffic or frequently used areas, the hard-surfaced floor may begin to exhibit a dull or faded appearance. Additionally, the hard-surfaced floor may become scratched. When the hard-surfaced floor is scratched, an indentation is created in a top surface of the hard-surfaced floor. The scratch may be formed solely in the topcoat on the top surface of the hard-surfaced floor or may extend through the topcoat of the hard-surfaced floor and into a base of the hard-surfaced floor. Depending on the depth and type of scratch, the scratch may even exhibit a substantially white color. Since most hard-surfaced floors are substantially dark in color, these types of scratches thereby produce substantially noticeable marks in the hard-surfaced floor.

If areas of the hard-surfaced floor begin to exhibit wear, in order to reduce the dull, faded, and/or scratched appearance of these areas, a coating known as a spray buff can be applied to the hard-surfaced floor. The spray buff is essentially a substantially clear liquid acrylic that is buffed onto the areas of the hard-surfaced floor in need of reconditioning. The spray buff increases the gloss level of the hard-surfaced floor thereby reducing the dull and/or faded appearance of the hard-surfaced floor. Additionally, as the spray buff is buffed onto the hard-surfaced floor, the spray buff is urged into the scratches to reduce the indentations in the hard-surfaced floor. However, since the spray buff is clear, the spray buff is incapable of significantly reducing the appearance of the scratches in the hard-surfaced floor, particularly if the scratches are substantially white in color.

Alternatively, the entire hard-surfaced floor could be refinished using a coating known as a keycoat or tiecoat. The tiecoat is substantially clear and comprises water and an acrylic polymer. In order to refinish the hard-surfaced floor using the tiecoat, the entire hard-surfaced floor must first be cleaned with an intensive floor cleaner. The hard-surfaced floor is then rinsed, and a floor cleaner is applied to the hard-surfaced floor. After the hard-surfaced floor dries, the tiecoat is applied to the hard-surfaced floor. As the tiecoat is applied to the hard-surfaced floor, the tiecoat is urged into the scratches to reduce the indentations in the hard-surfaced floor. A finishing coat or new topcoat is then applied to a top surface of the tiecoat to give the hard-surfaced floor a glossy appearance. The tiecoat thereby essentially adheres the finishing coat to the topcoat on the top surface of the hard-surfaced floor. However, the tiecoat may not effectively adhere the finishing coat to the topcoat in instances where the topcoat is cross-linked, densely cross-linked, or radiation cross-linked. Additionally, since the tiecoat is substantially clear, the tiecoat is incapable of significantly reducing the appearance of the scratches in the hard-surfaced floor, particularly if the scratches are substantially white in color.

BRIEF SUMMARY OF THE INVENTION

The present invention relates to a method for improving the appearance of a hard-surfaced floor. The method comprises selecting a tinted coating comprising a base component and at least one colorant wherein the colorant is selected from the group consisting of a tint, a dye, and a pigment; applying the tinted coating to a topcoat on a top surface of the hard-surfaced floor; and urging the tinted coating into any scratches in the hard-surfaced floor.

The invention further relates to a tinted coating for a hard-surfaced floor. The tinted coating comprises a base component and at least one colorant. The colorant is selected from the group consisting of a tint, a dye, and a pigment.

DETAILED DESCRIPTION OF THE EMBODIMENT(S)

Figure 1:
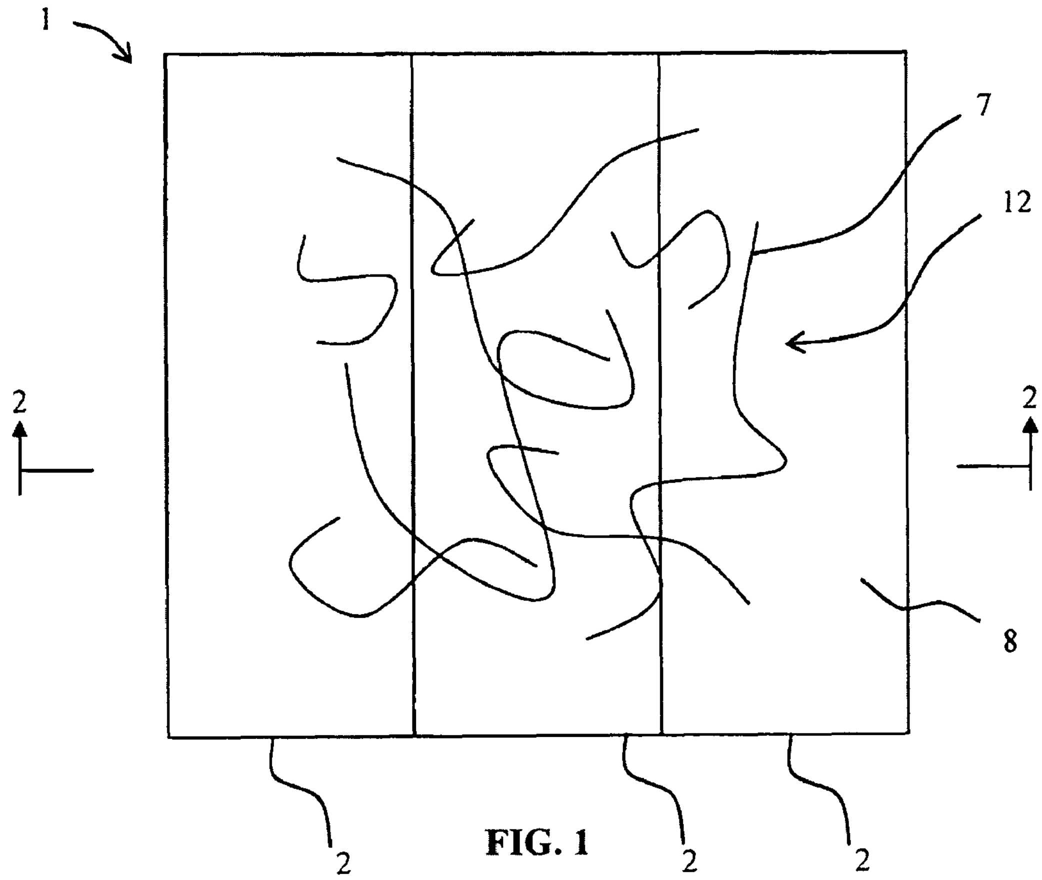
FIG. 1 is a plan view of a hard-surfaced floor.
Figure 2:
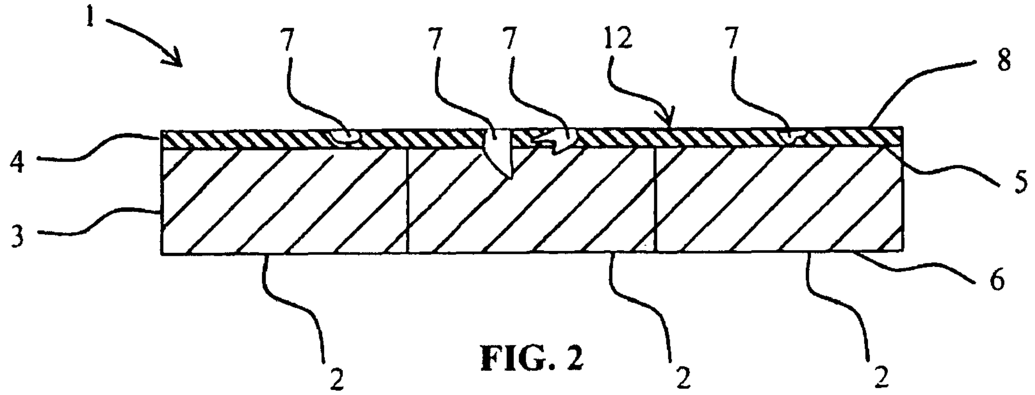
FIG. 2 is a sectional view taken along line 2-2 of FIG. 1.

FIG. 1 shows at least a section of a hard-surfaced floor 1. The hard-surfaced floor 1 shown and described herein is a hardwood floor, such as a solid or engineered hardwood floor; however, it will be appreciated by those skilled in the art that the hard-surfaced floor may alternatively be a laminate, cork, bamboo, or other hard-surfaced flooring product. Additionally, the hard-surfaced floor 1 may be a commercial or residential hard-surfaced floor. As shown in FIG. 1, the hard-surfaced floor 1 comprises a plurality of floor planks or floor strips 2. As shown in FIG. 2, each of the floor planks 2 comprises a base 3 having an upper surface 5 and a lower surface 6. The upper surface 5 of the base 3 is provided with a topcoat 4 chosen based on its durability, abrasion resistance, and gloss level. The topcoat 4 may comprise, for example, a composition selected from the group consisting of urethane, acrylic, urethane acrylate, epoxy acrylate, polyester acrylate, or polyether acrylate. The topcoat 4 may also include various additives, such as stains, abrasion particles, and/or flattening agents. The topcoat 4 may also be cross-linked, densely cross-linked, or radiation cross-linked. Additionally, it will be appreciated by those skilled in the art that although the topcoat 4 is shown and described herein as being a single layer topcoat, that the topcoat 4 could alternatively be a multiple layer topcoat.

In the illustrated embodiment, the hard-surfaced floor 1 has at least one area 12 that has a plurality of scratches 7 and/or is dull or faded in appearance. The scratches 7 create indentations in the hard-surfaced floor 1. The scratches 7 may be formed solely in the topcoat 4 on a top surface 8 of the hard-surfaced floor 1 or may extend through the topcoat 4 of the hard-surfaced floor 1 and into the base 3 of the hard-surfaced floor 1. Depending on the depth and type of each of the scratches 7, at least some of the scratches 7 may exhibit a substantially white color.

Figure 3:
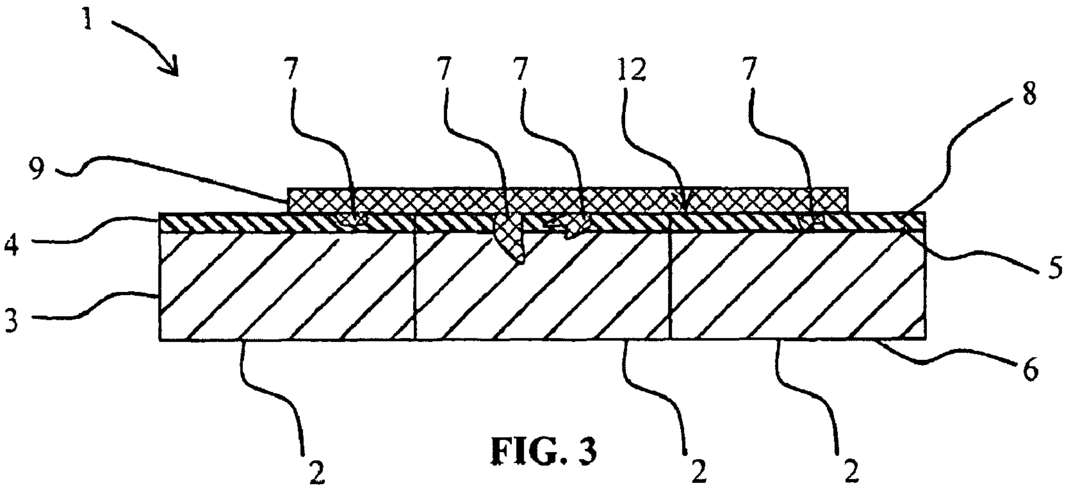
FIG. 3 is a sectional view showing the hard-surfaced floor of FIG. 2 after having been applied with a tinted spray buff.

In order to significantly reduce the appearance of the scratches 7 in the hard-surfaced floor 1 and/or reduce the dull or faded appearance of the hard-surfaced floor 1, a tinted coating is applied to the area 12 of the hard-surfaced floor 1 having the scratches 7 and/or the dull or faded appearance, as shown in FIG. 3. The tinted coating may be, for example, a tinted spray buff 9 that is applied to the topcoat 4 on the top surface 8 of the hard-surfaced floor 1. The tinted spray buff 9 comprises a base component mixed with a colorant. The base component may be, for example, a conventional liquid spray buff, and the colorant may be a tint, dye, pigment, or any other type of ingredient capable of imparting color to the spray buff. The spray buff may be, for example, acrylic water and may comprise, for example, about 80-90% wt water, 5-10% weight 2-butoxyethanol, 1-5% wt isopropyl alcohol, and 1-5% wt acrylic polymer. It will be appreciated by those skilled in the art that although the tinted spray buff 9 is described herein as being a liquid that the tinted spray buff 9 may alternatively be a suspension or solid material that could be applied to the top surface 8 of the hard-surfaced floor 1 by evaporation or the application of energy for polymerization, respectively. The colorant may comprise, for example, water, maganese trioxide, propylene glycol, surfactant, and a pigment, such as raw umber, brown, and/or chrome (III) AZO. Suitable colorants are manufactured, for example, by PPG Industries of Pittsburgh, Pa. The tinted spray buff 9 may comprise for example, up to about 60% wt of the colorant, preferably up to about 25% wt of the colorant, and more preferably about 0.5-5% wt of the colorant. Table 1 shows some examples of some tinted spray buff 9 formulations for various colors using various colorants manufactured by PPG Industries of Pittsburgh, Pa.

TABLE 1

Tinted Spray Buff Formulations

| Gold-1 | | EX-1 (g) | (% wt) | EX-2 (g) | (% wt) |
|---|---|---|---|---|---|
| Base Component | acrylic water | 29.13 | 97.10 | 29.71 | 99.03 |
| Colorant | A719 | 0.240 | 0.801 | 0.0801 | 0.267 |
| Colorant | A718 | 0.261 | 0.871 | 0.0871 | 0.290 |
| Colorant | A504 | 0.369 | 1.23 | 0.123 | 0.410 |
| **Red/Orange-2** | | **EX-3 (g)** | **(% wt)** | **EX-4 (g)** | **(% wt)** |
| Base Component | acrylic water | 28.96 | 96.52 | 29.65 | 98.84 |
| Colorant | A719 | 0.405 | 1.35 | 0.135 | 0.450 |
| Colorant | A467 | 0.405 | 1.35 | 0.135 | 0.450 |
| Colorant | A470 | 0.234 | 0.781 | 0.0781 | 0.260 |
| **Natural-3** | | **EX-5 (g)** | **(% wt)** | **EX-6 (g)** | **(% wt)** |
| Base Component | Acrylic water | 29.88 | 99.60 | 29.96 | 99.87 |
| Colorant | A718 | 0.0638 | 0.213 | 0.0213 | 0.0709 |
| Colorant | A720 | 0.0552 | 0.184 | 0.0184 | 0.0614 |

TABLE 1-continued

Tinted Spray Buff Formulations

| Black-4 | | EX-7 (g) | (% wt) | EX-8 (g) | (% wt) |
|---|---|---|---|---|---|
| Base Component | acrylic water | 28.86 | 96.19 | 29.62 | 98.73 |
| Colorant | A236 | 0.396 | 1.32 | 0.132 | 0.440 |
| Colorant | A397 | 0.402 | 1.34 | 0.134 | 0.446 |
| Colorant | A772 | 0.345 | 1.15 | 0.115 | 0.384 |
| **Brown-5** | | **EX-9 (g)** | **(% wt)** | **EX-10 (g)** | **(% wt)** |
| Base Component | acrylic water | 28.46 | 94.88 | 29.49 | 98.29 |
| Colorant | A720 | 0.490 | 1.63 | 0.163 | 0.545 |
| Colorant | A718 | 0.506 | 1.69 | 0.169 | 0.562 |
| Colorant | A485 | 0.540 | 1.80 | 0.180 | 0.600 |
| **Cherry-6** | | **EX-11 (g)** | **(% wt)** | **EX-12 (g)** | **(% wt)** |
| Base Component | acrylic water | 28.39 | 94.64 | 29.46 | 98.21 |
| Colorant | A722 | 0.359 | 1.20 | 0.120 | 0.399% |
| Colorant | A719 | 0.839 | 2.80 | 0.280 | 0.932 |
| Colorant | A692 | 0.0857 | 0.286 | 0.0286 | 0.0952 |
| Colorant | A485 | 0.325 | 1.08 | 0.108 | 0.361 |

Figure 4:
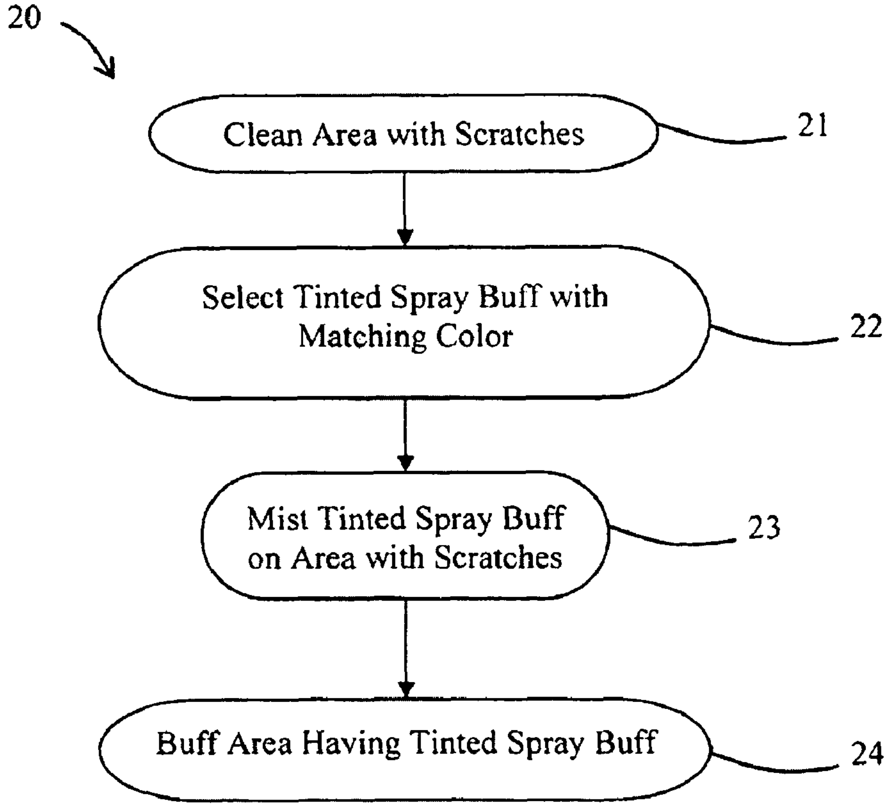
FIG. 4 is a flowchart illustrating a method of applying the tinted spray buff to the hard-surfaced floor.

An exemplary method of applying the tinted spray buff 9 to the area 12 of the hard-surfaced floor 1 having the scratches 7 and/or dull or faded appearance will now be described in greater detail with reference to flowchart 20 shown in FIG. 4. Before applying the tinted spray buff 9 to the hard-surfaced floor 1, the area 12 of the hard-surfaced floor 1 having the scratches 7 and/or dull or faded appearance should be cleaned using any approved method, such as with a vacuum, dust mop, or broom, to remove any dirt or debris from the area 12 where the tinted spray buff 9 will be applied, as shown at step 21. Although a more extensive cleaning of the area 12 where the tinted spray buff 9 will be applied could be performed, it is only necessary to clean the area 12 such that any loose dirt or debris that could mix with the tinted spray buff 9 or further scratch the hard-surfaced floor 1 during buffing (described later) is removed.

The tinted spray buff 9 is then selected by matching the color of the tinted spray buff 9 with the color of the hard-surfaced floor 1, as shown at step 22. Because an exact color match may be difficult to obtain, the color of the tinted spray buff 9 is preferably the closest shade possible to the color of the hard-surfaced floor 1. For example, the color of the tinted spray buff 9 may be one shade lighter or one shade darker than the color of the hard-surfaced floor 1. Table 2 is an exemplary color matching chart that matches the tinted spray buff formulations in Table 1 to various lines of solid and engineered hardwood floors manufactured by Armstrong World Industries, Inc. of Lancaster, Pa. It will be appreciated by those skilled in the art, however, that Table 2 is merely illustrative of a few matching possibilities for the tinted spray buff formulations in Table 1 and that other matching possibilities may be possible within the scope and spirit of the invention. For example, the tinted spray buff 9 may alternatively be chosen to be a different color than the color of the hard-surfaced floor 1 depending on the desired end color of the area 12 of the hard-surfaced floor 1.

TABLE 2

| Exemplary Color Matching Chart | | | | | | |
|---|---|---|---|---|---|---|
| Premier Performance | Maple | Red Oak | Walnut | Cherry | Birch | Hickory |
| | Natural-3 | Natural-3 | Bronze-5 | Natural-1 | Copper Mine-2 | Country Natural-1 |
| | Maize-3 | Golden Grain-1 | Ginger-5 | | Cinnamon Stick-6 | Caramel Corn-2 |
| | Honey-2 | Windswept Grey-3 | | | *Vanilla* Bean-5 | |
| | Gray-3 | Maduro Brown-5 | | | | |
| | Mushroom-3 | Black Olive-4 | | | | |
| | Black-4 | Cinnamon-3 | | | | |
| | | Copper-2 | | | | |
| | | Hazelnut-5 | | | | |
| Heritage Classic | Oak | Maple | Hickory | | | |
| | Yellowstone-1 | Antique Natural-3 | Antique Natural-1 | | | |
| | Bighorn-5 | Copper Canyon-2 | Brandywine-6 | | | |
| | Rushmore-5 | Durango-5 | | | | |
| | Redwood-2 | Blue Ridge-5 | | | | |
| | | Rio Grande-5 | | | | |
| | | Adirondack Brown-5 | | | | |
| Century Farm | Maple | Hickory | Yellow Birch | | | |
| | Antique Cashew-3 | Natural-3 | Burlap-2 | | | |
| | Sand Dune-2 | Honey Butter-5 | Cobbler Brown-5 | | | |
| | Burnt Almond-2 | Tumbleweed-5 | | | | |
| | Bittersweet-2 | Brick Dust-2 | | | | |
| | Black Coffee-4 | Dark Brown-5 | | | | |
| | Peppercorn-4 | | | | | |
| Metro Classics | Pecan | Maple | Birch | | | |
| | Natural Wild Pecan-3 | Country Natural-3 | Saffron-3 | | | |
| | Tequila-2 | Natural-3 | Cayenne-2 | | | |
| | Black Pepper-5 | Toasted Almond-2 | Mocha-5 | | | |
| | Paprika-2 | Cinnamon-2 | | | | |
| | Molasses-6 | Cocoa Brown-5 | | | | |
| Beckford | Oak Natural-3 | | | | | |
| | Harvest Oak-3 | | | | | |
| | Auburn-2 | | | | | |
| | Canyon-2 | | | | | |
| | Bark-5 | | | | | |
| | Cherry-6 | | | | | |
| Locking | Australian Wormy Chestnut | Bamboo | White Oak | Merbau | | |
| | Cocoa-6 | Carbonized Natural-3 | Natural-3 | Natural-6 | | |
| | Butterscotch-2 | | | | | |
| Valenza | Cabreuva-2 | Kempas-6 | Tigerwood-2 | Tauari-2 | Jatoba-2 | Sakura-3 |
| | Brazilian Ruby Ironwood-6 | Lapacho-5 | | | | |

The tinted spray buff 9 is misted or sprayed onto the area 12 of the hard-surfaced floor 1 having the scratches 7, as shown at step 23. The tinted spray buff 9 may be misted or sprayed onto the hard-surfaced floor 1, for example, with a spray bottle. It will be appreciated by those skilled in the art, however, that the tinted spray buff 9 may alternatively be applied to the hard-surfaced floor 1 with an applicator or other transfer medium or poured onto the hard-surfaced floor 1 in small amounts and then spread over the area 12. The area 12 with the tinted spray buff 9 is then immediately buffed with a buffing pad (not shown) at a speed of 100-3000 rpm, and preferably a medium to high speed of about 750-1500 rpm with a conventional automatic floor buffer (not shown), as shown at step 24. Examples of suitable conventional automatic floor buffers (not shown) include the electronic sander-polishers by Makita Corporation of La Mirada, Calif. and the ADVANCE SHADOW 1.7 by Nilfisk-Advance, Inc. of Plymouth, Minn. Alternatively, the area 12 with the tinted spray buff 9 may be manually buffed or buffed with a hand-held buffer (not shown) having a speed of about 100-8000 rpm. The buffing pad (not shown) may be a cloth or any conventional buffing pad. The buffing pad (not shown) may have an abrasive rating, for example, of about 3100-7300, preferably about 3200-5100, and more preferably about 3500-4100. The conventional automatic floor buffer (not shown) burnishes the hard-surfaced floor 1 while simultaneously urging the tinted spray buff 9 into the scratches 7 thereby substantially filling the scratches 7 with the tinted spray buff 9, as shown in FIG. 3. A buffer skirt (not shown) may optionally be provided on the conventional automatic floor buffer (not shown) to prevent the tinted spray buff 9 from inadvertently spraying onto surrounding surfaces during buffing.

Because the tinted spray buff 9 according to the invention contains a colorant that substantially matches the color of the hard-surfaced floor 1, when the tinted spray buff 9 is applied, the tinted spray buff 9 significantly reduces the appearance of the scratches 7 in the hard-surfaced floor 1. Additionally, the tinted spray buff 9 increases the gloss level of the hard-surfaced floor 1 thereby reducing the dull or faded appearance of the hard-surfaced floor 1. For example, the gloss level of the area 12 having the dull or faded appearance may increase up to about 80% after application of the tinted spray buff 9 to the hard-surfaced floor 1. Further, because the method of applying the tinted spray buff 9 is quick and easy, the above-described method can be repeated as often as needed (e.g., every few days, every few weeks, every few months, etc.) to the hard-surfaced floor 1 to improve the overall look and quality of the hard-surfaced floor 1.

Figure 5:
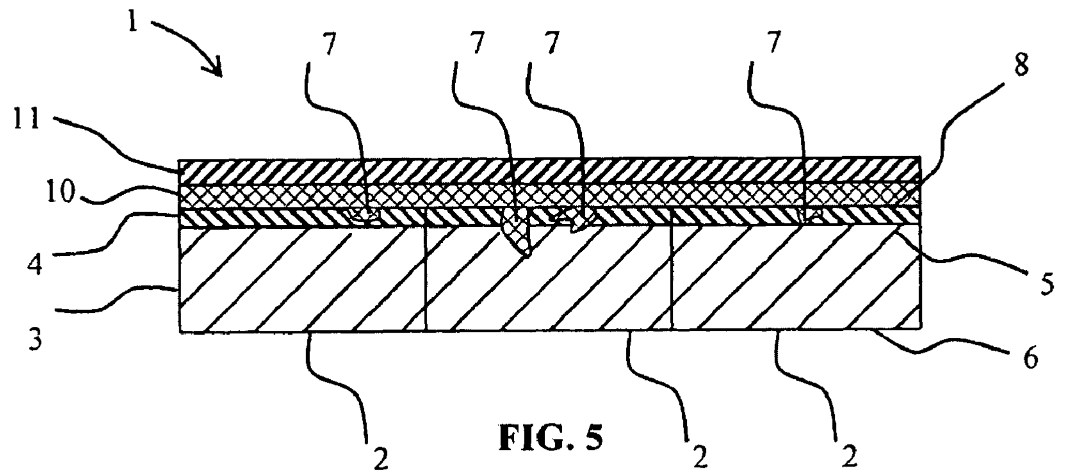
FIG. 5 is a sectional view showing the hard-surfaced floor of FIG. 2 after having been applied with a tinted tiecoat and finishing coat.

Alternatively, in order to significantly reduce the appearance of the scratches 7 on the hard-surfaced floor 1 and/or reduce the dull or faded appearance of the hard-surfaced floor 1, the hard-surfaced floor 1 may be completely refinished. To refinish the hard-surfaced floor 1, a tinted coating is applied to the entire surface of the hard-surfaced floor 1, as shown in FIG. 5. The tinted coating may be, for example, a tinted keycoat or tiecoat 10 that is applied to the topcoat 4 on the top surface 8 of the hard-surfaced floor 1. The tinted tiecoat 10 comprises a base component mixed with a colorant. The base component may be, for example, a conventional liquid tiecoat, and the colorant may be a tint, dye, pigment, or any other type of ingredient capable of imparting color to the tiecoat. It will be appreciated by those skilled in the art that although the tinted tiecoat 10 is described herein as being a liquid that the tinted tiecoat 10 may alternatively be a suspension or solid material that could be applied to the top surface 8 of the hard-surfaced floor 1 by evaporation or the application of energy for polymerization, respectively. The tiecoat may comprise, for example, acrylic polymer and water. Suitable tiecoats are manufactured, for example, by Basic Coatings, Inc. of Toledo Ohio. The colorant may comprise, for example, water, maganese trioxide, propylene glycol, surfactant, and a pigment, such as raw umber, brown, and/or chrome (III) AZO. Suitable colorants are manufactured, for example, by PPG Industries of Pittsburgh, Pa. The tinted tiecoat 10 may comprise, for example, up to about 80% wt of the colorant, preferably up to about 10% wt colorant, and more preferably about 0.1-2% colorant. Table 3 shows some examples of some tinted tiecoat formulations for various colors using various colorants manufactured by PPG Industries of Pittsburgh, Pa.

TABLE 3

Tinted Tiecoat Formulations

| Gold-1 | | EX-13 (g) | (% wt) | EX-14 (g) | (% wt) |
|---|---|---|---|---|---|
| Base Component | acrylic water | 29.71 | 99.03 | 29.85 | 99.52 |
| Colorant | A719 | 0.0801 | 0.267 | 0.0401 | 0.134 |
| Colorant | A718 | 0.0871 | 0.290 | 0.0436 | 0.145 |
| Colorant | A504 | 0.123 | 0.410 | 0.0615 | 0.205 |
| **Red/Orange-2** | | **EX-15 (g)** | **(% wt)** | **EX-16 (g)** | **(% wt)** |
| Base Component | acrylic water | 29.71 | 99.03 | 29.85 | 99.51 |
| Colorant | A719 | 0.136 | 0.453 | 0.0680 | 0.227 |
| Colorant | A467 | 0.0773 | 0.258 | 0.0387 | 0.129 |
| Colorant | A470 | 0.0785 | 0.262 | 0.0393 | 0.131 |
| **Natural-3** | | **EX-17 (g)** | **(% wt)** | **EX-18 (g)** | **(% wt)** |
| Base Component | acrylic water | 29.96 | 99.87 | 29.98 | 99.93 |
| Colorant | A718 | 0.0213 | 0.0709 | 0.01063 | 0.0354 |
| Colorant | A720 | 0.0184 | 0.0614 | 0.00920 | 0.0307 |
| **Black-4** | | **EX-19 (g)** | **(% wt)** | **EX-20 (g)** | **(% wt)** |
| Base Component | acrylic water | 29.87 | 99.58 | 29.81 | 99.37 |
| Colorant | A236 | 0.0440 | 0.147 | 0.0660 | 0.220 |
| Colorant | A397 | 0.0446 | 0.149 | 0.0669 | 0.223 |
| Colorant | A772 | 0.0384 | 0.128 | 0.0576 | 0.192 |
| **Brown-5** | | **EX-21 (g)** | **(% wt)** | **EX-22 (g)** | **(% wt)** |
| Base Component | acrylic water | 29.83 | 99.43 | 29.94 | 99.81 |
| Colorant | A720 | 0.0545 | 0.182 | 0.0182 | 0.0605 |
| Colorant | A718 | 0.0562 | 0.187 | 0.0187 | 0.0625 |
| Colorant | A485 | 0.0600 | 0.200 | 0.0200 | 0.0667 |
| **Cherry-6** | | **EX-23 (g)** | **(% wt)** | **EX-24 (g)** | **(% wt)** |
| Base Component | acrylic water | 29.82 | 99.40 | 29.94 | 99.80 |
| Colorant | A722 | 0.0399 | 0.133 | 0.0133 | 0.0443 |
| Colorant | A719 | 0.0932 | 0.311 | 0.0311 | 0.104 |
| Colorant | A692 | 0.00952 | 0.0317 | 0.00317 | 0.0106 |
| Colorant | A485 | 0.0361 | 0.120 | 0.0120 | 0.0401 |

Figure 6:
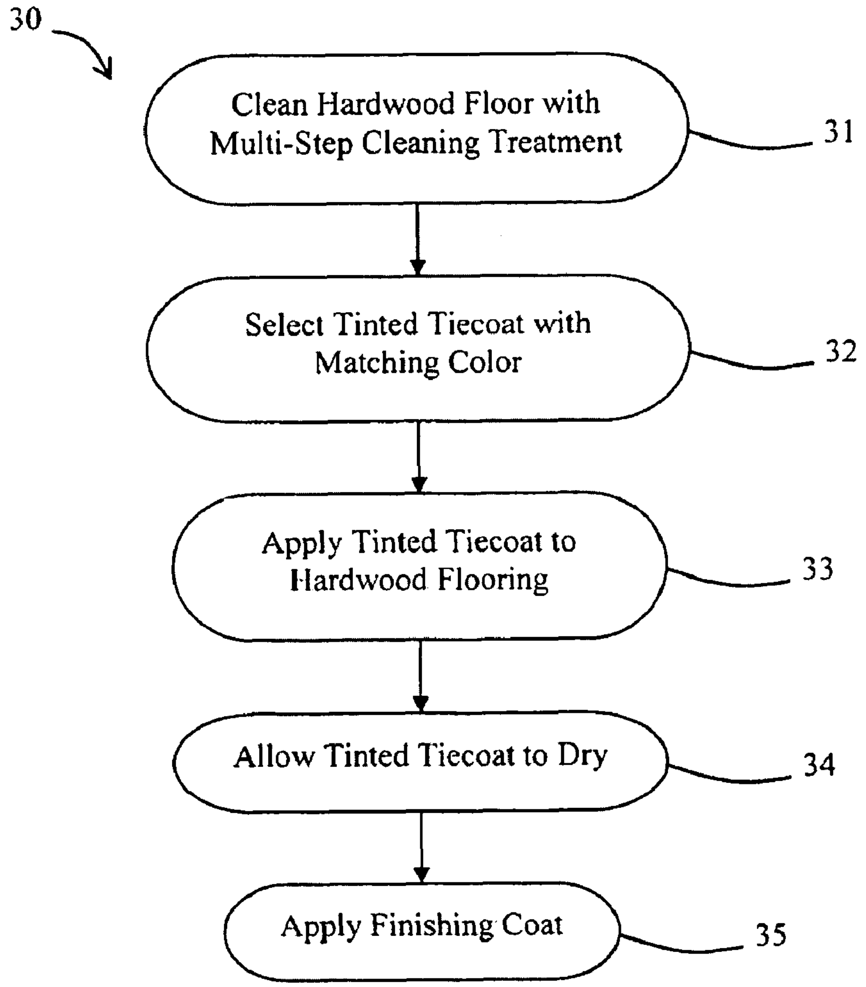
FIG. 6 is a flowchart illustrating a method of applying the tinted tiecoat to the hard-surfaced floor.

An exemplary method of applying the tinted tiecoat 10 to the hard-surfaced floor 1 in order to refinish the hard-surfaced floor 1 will now be described in greater detail with reference to flowchart 30 shown in FIG. 6. Before applying the tinted tiecoat 10 to the hard-surfaced floor 1, the hard-surfaced floor 1 is cleaned with a multi-step cleaning treatment, as shown at step 31. The multi-step cleaning treatment may include, for example, the use of an intensive floor cleaner, such as a high pH floor cleaner or other floor cleaner capable of breaking-up oil and dirt. An example of a suitable intensive floor cleaner is I.F.T. by Basic Coatings, Inc. of Toledo Ohio. The intensive floor cleaner is misted or sprayed onto the hard-surfaced floor 1. The intensive floor cleaner may be misted or sprayed onto the hard-surfaced floor 1, for example, with a spray bottle. It will be appreciated by those skilled in the art, however, that the intensive floor cleaner may alternatively be applied to the hard-surfaced floor 1 with an applicator or other transfer medium or poured onto the hard-surfaced floor 1 in small amounts then spread thereon.

The hard-surfaced floor 1 with the intensive floor cleaner is wiped, for example, with a mop or alternatively, depending on the composition of the topcoat 4 of the hard-surfaced floor 1, buffed with a buffing pad (not shown). For example, if the topcoat 4 of the hard-surfaced floor 1 is UV cross-linked or densely cross-linked, it may be necessary to buff the hard-surfaced floor 1 in order to ensure proper adherence of the tinted tiecoat 10 to the topcoat 4. The hard-surfaced floor 1 is buffed with a buffing pad (not shown) at a speed of about 100-750 rpm, and preferably at a low to medium speed of about 190-350 rpm with a conventional automatic floor buffer (not shown). Alternatively, the hard-surfaced floor 1 may be buffed with a hand-held buffer (not shown) having a speed of about 100-8000 rpm. Examples of suitable conventional automatic floor buffers (not shown) include the electronic sander-polishers by Makita Corporation of La Mirada, Calif. and the ADVANCE SHADOW 17 by Nilfisk-Advance, Inc. of Plymouth, Minn. The buffing pad (not shown) may be any conventional buffing pad. The buffing pad (not shown) may have an abrasiveness rating of between about 3100-7300 and preferably between about 3500-5100. The abrasiveness of the buffing pad (not shown) combined with the speed of the conventional automatic floor buffer (not shown) enables the hard-surfaced floor 1 to be cleaned and roughened sufficiently without unduly damaging the hard-surfaced floor 1 so that when the tinted tiecoat 10 is applied (described later), the tinted tiecoat 10 adequately adheres to the hard-surfaced floor 1. A buffer skirt (not shown) may optionally be provided on the conventional automatic floor buffer (not shown) to prevent the tinted tiecoat 10 from inadvertently spraying onto surrounding surfaces during buffing.

After the hard-surfaced floor 1 is cleaned with the intensive floor cleaner, the hard-surfaced floor 1 is rinsed. The hard-surfaced floor 1 may be rinsed, for example, by wiping the hard-surfaced floor 1 with a water-moistened cloth. The hard-surfaced floor 1 is then cleaned with a floor cleaner. The floor cleaner may be any conventional floor cleaner capable of removing any film that may be left on the hard-surfaced floor 1 as a result of the application of the intensive floor cleaner. Examples of suitable floor cleaners include SQUEAKY by Basic Coatings, Inc. of Toledo, Ohio, and Armstrong Hardwood and Laminate Floor Cleaner by Armstrong World Industries, Inc. of Lancaster, Pa. The floor cleaner can be misted or spayed on the hard-surfaced floor 1 as the hard-surfaced floor 1 is wiped with a mop. The floor cleaner may be misted or sprayed onto the hard-surfaced floor 1, for example, with a spray bottle. It will be appreciated by those skilled in the art, however, that the floor cleaner may alternatively be applied to the hard-surfaced floor 1 with an applicator or other transfer medium or poured onto the hard-surfaced floor 1 in small amounts then spread thereon. The hard-surfaced floor 1 is then allowed to dry.

The tinted tiecoat 10 is then selected by matching the color of the tinted tiecoat 10 with the hard-surfaced floor 1, as shown at step 32. Because an exact color match may be difficult to obtain, the color of the tinted tiecoat 10 is preferably the closest shade possible to the color of the hard-surfaced floor 1. For example, the color of the tinted tiecoat 10 may be one shade lighter or one shade darker than the color of the hard-surfaced floor 1. It will be appreciated by those skilled in the art, however, that because the tinted tiecoat 10 is applied to the entire surface of the hard-surfaced floor 1, the tinted tiecoat 10 may alternatively be chosen to be a different color than the color of the hard-surfaced floor 1 depending on the desired end color of the hard-surfaced floor 1. Table 2 is an exemplary color matching chart that matches the tinted tiecoat formulations in Table 3 to various lines of solid and engineered hardwood floors manufactured by Armstrong World Industries, Inc. of Lancaster, Pa. It will be appreciated by those skilled in the art, however, that Table 2 is merely illustrative of a few matching possibilities for the tinted tiecoat formulations in Table 3 and that other matching possibilities may be possible within the scope and spirit of the invention.

The tinted tiecoat 10 is applied to the hard-surfaced floor 1, as shown at step 33. The tinted tiecoat 10 may be applied, for example, with a pad or a sponge mop or applied directly to the hard-surfaced floor 1 and then evenly spread thereon. The tinted tiecoat 10 is applied to the top surface 8 of the topcoat 4 such that the tinted tiecoat 10 substantially coats the topcoat 4 and is urged into the scratches 7 to substantially fill the scratches 7, as shown in FIG. 5. The tinted tiecoat 10 is then allowed to dry for about 1 hour, as shown at step 34.

A finishing coat 11 is applied on top of the tinted tiecoat 10, as shown in FIG. 5 and at step 35. The finishing coat 11 is essentially a new topcoat applied to the hard-surfaced floor 1. The finishing coat 11 may be, for example, any conventional finishing coat, which may be chosen based on its durability, abrasion resistance, and gloss level. An example of a suitable finishing coat 11 is the water-based finishing coat STREET-SHOE by Basic Coatings, Inc. of Toledo Ohio. The finishing coat 11 may be applied, for example, with a pad or a sponge mop or applied directly to the hard-surfaced floor 1 and then evenly spread thereon. Because many finishing coats are commercially available, and the method of applying the finishing coat is well known in the art, further description of the finishing coat has been omitted.

Because the tinted tiecoat 10 according to the invention contains a colorant that substantially matches the color of the hard-surfaced floor 1, when the tinted tiecoat 10 is applied, the tinted tiecoat 10 significantly reduces the appearance of the scratches 7 in the hard-surfaced floor 1. Additionally, by buffing the hard-surfaced floor 1 prior to applying the tinted tiecoat 10, the hard-surfaced floor 1 is sufficiently cleaned and roughened to ensure proper adherence of the tinted tiecoat 10 to the topcoat 4, especially in instances where the topcoat 4 is cross-linked, densely cross-linked, or radiation cross-linked.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A tinted coating for a hard-surfaced floor, comprising:

a base component and at least one colorant, the colorant being selected from the group consisting of a tint, a dye, and a pigment; and wherein the hard-surfaced floor is selected from the group consisting of hardwood, wood laminate, cork, or bamboo;

wherein the base component comprises from about 1% to about 5% by weight of an acrylic polymer and from about 80% to about 90% by weight of water.

2. The tinted coating of claim 1, wherein the hard-surfaced floor is a hardwood floor.

3. The tinted coating of claim 1, wherein the colorant comprises maganese trioxide, propylene glycol, surfactant, a pigment and water.

4. The tinted coating of claim 1, wherein the tinted coating is a tinted tiecoat or a tinted spray buff.

5. The tinted coating of claim 4, wherein the tinted coating is the tinted spray buff and the tinted coating is from about 0.5% to about 60% by weight of the colorant.

6. The tinted coating of claim 5, wherein the tinted coating is the tinted spray buff and the tinted coating is from about 0.5% to about 25% by weight of the colorant.

7. The tinted coating of claim 6, wherein the tinted coating is the tinted spray buff and the tinted coating is from about 0.5 to about 5% by weight of the colorant.

8. The tinted coating of claim 4, wherein the tinted coating is the tinted tiecoat and the tinted coating is from about 0.1% to about 80% by weight of the colorant.

9. The tinted coating of claim 8, wherein the tinted coating is the tinted tiecoat and the tinted coating is from about 0.1% to about 10% by weight of the colorant.

10. The tinted coating of claim 9, wherein the tinted coating is the tinted tiecoat and the tinted coating is from about 0.1 to about 2% by weight of the colorant.

* * * * *